(12) United States Patent
Hwang et al.

(10) Patent No.: US 12,085,493 B2
(45) Date of Patent: Sep. 10, 2024

(54) VISCOSITY MEASUREMENT DEVICE AND METHOD FOR MEASURING VISCOSITY

(71) Applicant: FORMOSA PLASTICS CORPORATION, Kaohsiung (TW)

(72) Inventors: Long-Tyan Hwang, Kaohsiung (TW);
Chieh-Shun Yang, Kaohsiung (TW);
Tsun-Yu Hsiao, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 0 days.

(21) Appl. No.: 17/864,150

(22) Filed: Jul. 13, 2022

(65) Prior Publication Data
US 2022/0349798 A1 Nov. 3, 2022

(30) Foreign Application Priority Data
Jul. 13, 2021 (TW) .................. 110125766

(51) Int. Cl.
*G01N 11/12* (2006.01)
*G01N 11/00* (2006.01)

(52) U.S. Cl.
CPC ...... *G01N 11/12* (2013.01); *G01N 2011/0093* (2013.01)

(58) Field of Classification Search
CPC .................. G01N 11/10; G01N 11/12; G01N 2011/0093; G01N 11/06
USPC ........... 73/23.31, 54.01, 54.15–54.17, 54.19, 73/54.21
See application file for complete search history.

(56) References Cited

U.S. PATENT DOCUMENTS

| | | | | |
|---|---|---|---|---|
| 3,328,704 A | * | 6/1967 | Wantland ............... | G01N 11/12 327/58 |
| 3,635,678 A | * | 1/1972 | Seitz ...................... | G01N 11/10 250/222.2 |
| 4,648,262 A | * | 3/1987 | Reis ....................... | G01N 11/12 73/54.18 |

(Continued)

FOREIGN PATENT DOCUMENTS

| | | |
|---|---|---|
| CN | 2807248 Y | 8/2006 |
| CN | 103105348 A * | 5/2013 |

(Continued)

*Primary Examiner* — Robert R Raevis
(74) *Attorney, Agent, or Firm* — Muncy, Geissler, Olds & Lowe, P.C.

(57) ABSTRACT

A viscosity measurement device and a method for measuring viscosity are provided. The viscosity measurement device includes a measurement container and an optical detection processing device. The measurement container accommodates a substance to be measured and a ball. The optical detection processing device includes an optical detector, a processing unit, a database, a controlling unit and a power supplying unit. The optical detector is disposed at a side of the measurement container to obtain an image to be analyzed from the measurement container. The processing unit is signally connected to the optical detector to process and analyze the image to be analyzed. The database stores the image to be analyzed. The controlling unit is connected to the optical detector and the processing unit to control the optical detector and the processing unit. The power supplying unit provides power for the optical detector, the processing unit and the controlling unit.

13 Claims, 3 Drawing Sheets

(56) References Cited

U.S. PATENT DOCUMENTS

| | | |
|---|---|---|
| 5,287,732 A | 2/1994 | Sekiguchi |
| 6,240,770 B1 | 6/2001 | Raffer |
| 8,079,250 B2 | 12/2011 | Sebok et al. |
| 2002/0178796 A1 | 12/2002 | Barbe et al. |

FOREIGN PATENT DOCUMENTS

| | | | |
|---|---|---|---|
| CN | 103792164 A | | 5/2014 |
| CN | 105319150 A | | 2/2016 |
| CN | 206945481 U | * | 1/2018 |
| CN | 107884313 A | * | 4/2018 |
| CN | 106596341 B | | 1/2019 |
| CN | 109253945 A | | 1/2019 |
| JP | H05034256 A | | 2/1993 |
| JP | H0712705 A | * | 1/1995 |
| JP | H09243542 A | | 9/1997 |
| JP | 2005121550 A | * | 5/2005 |
| JP | 2010185817 A | * | 8/2010 |
| TW | 200912277 | | 3/2009 |
| TW | 201205061 A1 | | 2/2012 |

* cited by examiner

VISCOSITY MEASUREMENT DEVICE AND METHOD FOR MEASURING VISCOSITY

RELATED APPLICATIONS

This application claims priority to Taiwan Application Serial Number 110125766, filed Jul. 13, 2021, which is herein incorporated by reference.

BACKGROUND

Field of Invention

The present invention relates to viscosity measurement technology. More particularly, the present invention relates to a viscosity measurement device and a method for measuring viscosity.

Description of Related Art

People usually have experience about pouring honey or water into a cup, different liquid have different flow speed due to different properties. For example, the flow speed of pouring honey is slower, and the flow speed of pouring water is faster. Or, when using olive oil to cook, the oil is much easier to slide as the temperature of a pot is higher. A reason of this phenomenon is because different liquids or same liquid with different temperatures have different viscosities. The viscosity is a kind of measure of resistance of flowing or deforming resulted from stress of the liquid such as shear stress and tensile stress.

For liquids, from a macro perspective, the viscosity is lower as the temperature is higher, and the viscosity is higher as the temperature is lower. From a micro perspective, an increase of the liquid temperature is equal to the increase of velocity of molecule movement. On the other hand, since the viscosity depends on an attractive force between molecules, molecules having stronger attractive force between each other have higher viscosity. Moreover, the viscosity also depends on a size and a shape of the molecule.

Common viscosity measurement devices are for example the viscosity measurement device disclosed by TW. No. 201205061 or a rotary viscometer disclosed by U.S. Pat. Nos. 5,287,732 and 6,240,770. However, these viscosity measurement devices are not only hard to operate but also expensive and have bad accuracy.

SUMMARY

Accordingly, an objective of the present invention is to provide a viscosity measurement device and a method for measuring viscosity, which have better measure accuracy and better measure speed.

According to the aforementioned objective of the present invention, a viscosity measurement device is provided. The viscosity measurement device includes a measurement container and an optical detection processing device. The measurement container is configured to accommodate a substance to be measured and a ball. The optical detector is disposed at a side of the measurement container, in which the optical detector is configured to obtain the image to be analyzed from the measurement container. The optical detector is disposed at the side of the measurement container and is configured to obtain an image to be analyzed from the measurement container. The processing unit is signally connected to the optical detector, and the processing unit is configured to process and analyze the image to be analyzed The database is signally connected to the processing unit and the optical detector, in which the database is configured to store the image to be analyzed obtained by the optical detector and the image to be analyzed processed by the processing unit The controlling unit is signally connected to the optical detector and the processing unit, the controlling unit is configured to control operations of the optical detector and the processing unit The power supplying unit is connected to the optical detector, the processing unit, and the controlling unit, in which the power supplying unit is configured to provide power for the optical detector, the processing unit, and the controlling unit.

According to one embodiment of the present invention, the aforementioned optical detection processing device further includes a display device signally connected to the processing unit, the controlling unit, and the power supplying unit, in which the display device is configured to display an analyzed result of the processing unit.

According to one embodiment of the present invention, the aforementioned viscosity measurement device further includes a light-emitting element, in which the light-emitting element and the optical detector are located at two opposite sides of the measurement container, and the light-emitting element is electrically connected to the controlling unit and the power supplying unit.

According to one embodiment of the present invention, the aforementioned measurement container is a light-transmissible container, and a plurality of graduations disposed on a surface of the measurement container.

According to one embodiment of the present invention, the aforementioned image to be analyzed is a dynamic image, the dynamic image comprises a moving image of the ball in the substance to be measured, and the processing unit is configured to compute liquid viscosity of the substance to be measured according to recording time of the dynamic image.

According to one embodiment of the present invention, the aforementioned optical detector includes a motion detecting element, and the motion detecting element is configured to detect a motion of the ball.

According to one embodiment of the present invention, the aforementioned image to be analyzed is a static image, the static image includes pictures of the substance to be measured, and the processing unit compares the static image with a reference image to determine whether the ball touches an inner wall of the measurement container or not.

According to the aforementioned objectives of the present invention, a method for measuring viscosity is provided. The method for measuring viscosity includes: providing the aforementioned viscosity measurement device; filling the measurement container with the substance to be measured; putting the ball into the measurement container containing the substance to be measured; using the optical detector to capture an image of the ball moving in the measurement container as the image to be analyzed; and using the processing unit to analyze the image to be analyzed to obtain liquid viscosity of the substance to be measured.

According to one embodiment of the present invention, the aforementioned database further stores temperature and density of the substance to be measured.

According to one embodiment of the present invention, the aforementioned display device is further configured to display temperature of the substance to be measured.

From the above embodiment of the present invention, it can be seen that the viscosity measurement device of the present invention mainly uses the optical detector to detect the process of moving of the ball in the substance to be measured, and computes the viscosity of the substance to be measured through the way of image analyzing such that the entire accuracy of measuring can be improved. On the other hand, the entire structure of the present invention is simplified compared to the conventional technology, hence it has the advantages of easy operation and low cost.

BRIEF DESCRIPTION OF THE DRAWINGS

To illustrate more clearly the aforementioned and the other objectives, features, merits, and embodiments of the present invention, the description of the accompanying figures are as follows.

DETAILED DESCRIPTION

Figure 1:
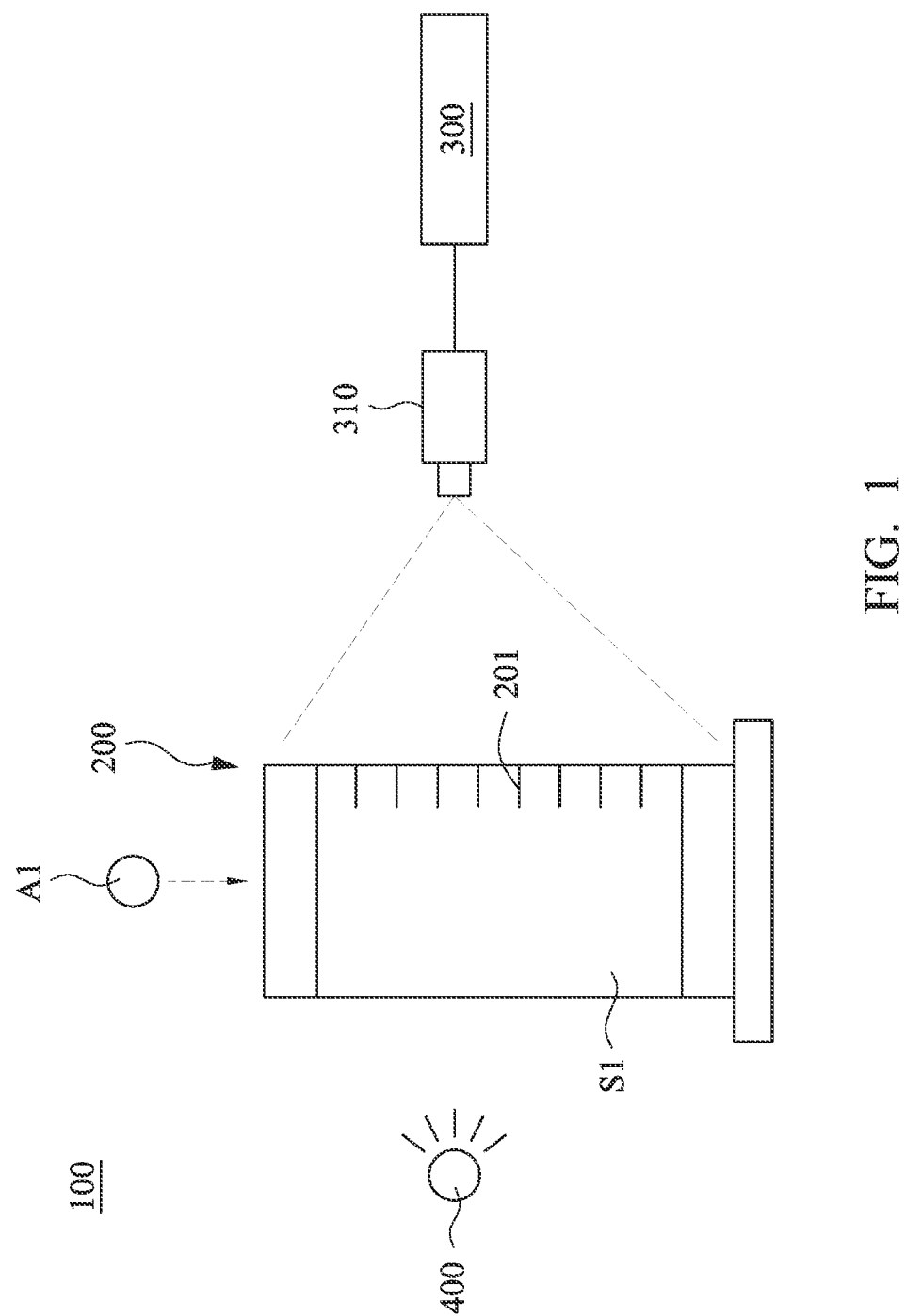
FIG. 1 shows a schematic diagram of a viscosity measurement device in accordance with one embodiment of the present invention.
Figure 2:
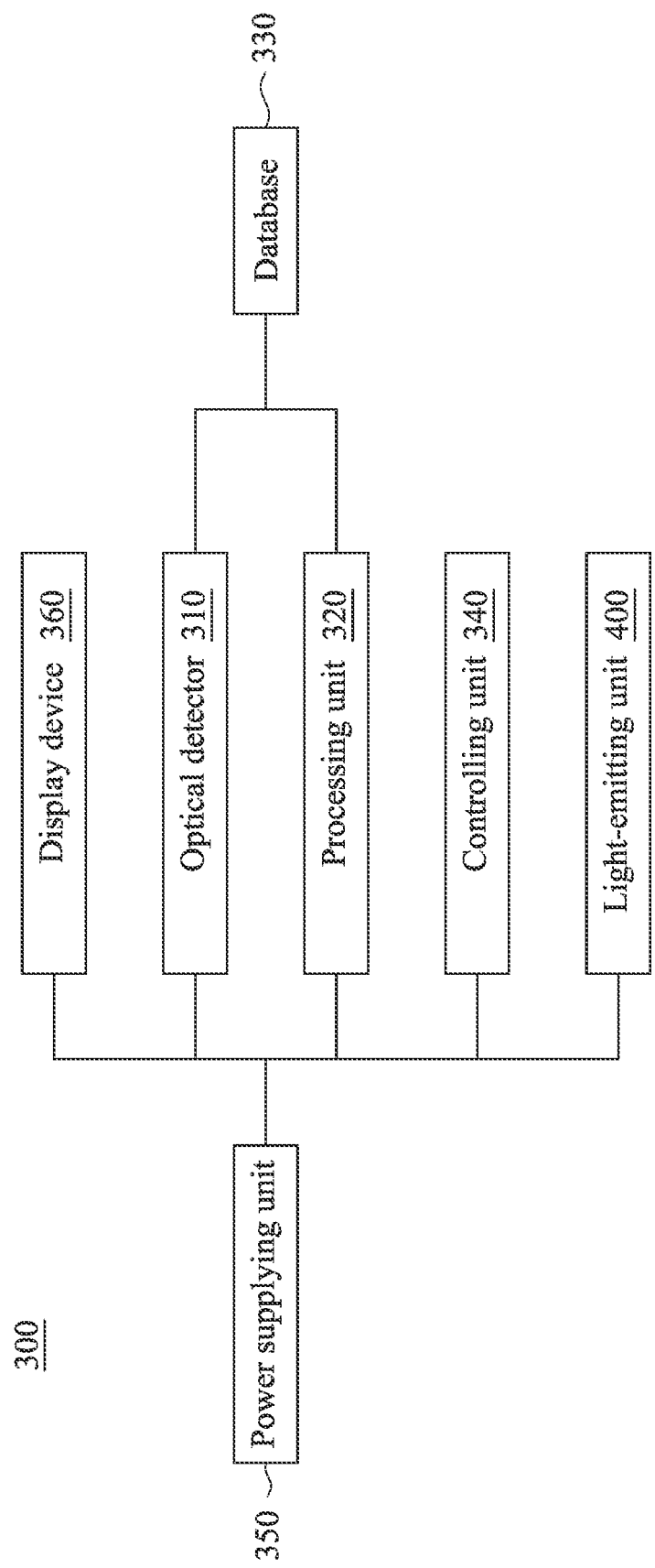
FIG. 2 is a schematic diagram of an optical detection processing device of the viscosity measurement device in accordance with one embodiment of the present invention.

Refer to FIG. 1 and FIG. 2 simultaneously, FIG. 1 shows a schematic diagram of a viscosity measurement device in accordance with one embodiment of the present invention, and FIG. 2 is a schematic diagram of an optical detection processing device of the viscosity measurement device in accordance with one embodiment of the present invention. A viscosity measurement device 100 includes a measurement container 200 and an optical detection processing device 300. The measurement container 200 is configured to contain a substance S1 to be measured and a ball A1. In an embodiment, the measurement container 200 is a transparent container 200, and plural graduations 201 are disposed on a surface of the measurement container 200, these graduations 201 are configured to display a distance the ball A1 moves in the substance S1 to be measured, or these graduations 201 can be used to move close to a top and a bottom of the measurement container 200 separately to be a mark of an initial position and a final position. The optical detection processing device 300 is disposed at a side of the measurement device 200, and is configured to obtain images to be analyzed from the measurement container 200 and analyze the images to be analyzed to further receive a liquid concentration of the substance S1 to be measured in the measurement device 200 by computing.

Refer to FIG. 1 and FIG. 2 again, the optical detection processing device 300 includes an optical detector 310, a processing unit 320, a database 330, a controlling unit 340, a power supplying unit 350, and a display device 360. The optical detector 310, the processing unit 320, the controlling unit 340 and the display device 360 are electrically connected to the power supplying unit 350 respectively, and the power supplying unit 350, and the power supplying unit 350 is mainly provides power for the optical detector 310, the processing unit 320, the controlling unit 340 and the display device 360.

As shown in FIG. 1, the optical detector 310 is disposed at a side of the measurement container 200, and the optical detector 310 is configured to obtain images to be analyzed from the measurement container 200. In an embodiment, the optical detector 310 can be a camera which can obtain dynamic images or static images of the ball A1 moving in the substance S1 to be measured in the measurement container 200 as images to be analyzed. The dynamic images are videos of the ball A1 moving from the initial position to the final position in the substance S1 to be measured in the measurement container 200 recorded by the camera; the static images are plural pictures of the ball A1 in the substance S1 to be measured in the measurement container 200 recorded by the camera.

As shown in FIG. 1 and FIG. 2, the viscosity measurement device 100 further includes a light-emitting element 400. The light-emitting element 400 and the optical detector 310 are located at two opposite sides of the measurement device 200, and the light-emitting element 400 is electrically connected to the controlling unit 340 and the power supplying unit 350. Specifically, the optical detector 310 is disposed in front of the measurement device 200 to obtain images, and the light-emitting element 400 is located behind of the measurement device 200 to light up. The purpose of disposing the light-emitting element 400 behind of the measurement device 200 to light up is to overexpose a background for highlighting a contrast of the images obtained by the optical detector 310. When the substance S1 to be measured is accommodated in the light-transmissible measurement device 200, lighting through the light-emitting element 400 can avoid the impact of micro bubbles in the substance S1 to be measured while the optical detector 310 is detecting. In other cases, the optical detector 310 can include a camera and a motion detecting element, for example, an infrared sensor or a ray sensor, to detect the motion of the ball A1 in the measurement device 200.

As shown in FIG. 2, the processing unit 320 is connected to the optical detector 310. The processing unit 320 is configured to process and analyze the images to be analyzed obtained by the optical detector 310. In some cases, the processing unit 320 can process the images to be analyzed by image processing. The database 330 is signally connected to the processing unit 320 and the optical detector 310, in which the database 330 is configured to store the images to be analyzed obtained from the optical detector 310, the images to be analyzed processed by the processing unit 320, plural reference images capable of being provided for comparing, or other parameter data such as a density of the ball A1, a weight of the ball A1, a density of the substance S1 to be measured, and a temperature of the substance S1 to be measured. Specifically, when the images to be analyzed include the dynamic images of ball A1 moving in the substance S1 to be measured, the processing unit 320 is configured to compute the viscosity of the substance S1 to be measured according to recording time of the dynamic images and a moving distance of the ball A1 in the substance S1 to be measured. When the images to be analyzed include plural static images of ball A1 in the substance S1 to be measured, the processing unit 320 is configured to determine whether the ball A1 touches an inner wall of the measurement container 200 or not according to the static images and the reference image such that potential inaccurate data is removed. In other embodiments, the processing unit 320 can also compute the viscosity of the substance S1 to be measured according to recording time of the static images and a moving distance of the ball A1 in the substance S1 to be measured. In other application ways, operators can also determine whether the ball A1 touches an inner wall of the measurement container 200 or not by replaying the images to be analyzed in the database 330.

As shown in FIG. 2, the controlling unit 340 is signally connected to the optical detector 310 and the processing unit 320. The controlling unit 340 is configured to control operations of the optical detector 310 and the processing unit 320, for example, opening and closing the optical detector 310 and setting the processing unit 320. In a concrete case, the controlling unit 340 can be an operating interface of a computer. The display device 360 is configured to display analyzed result of viscosity of the substance S1 to be measured of the processing unit 320.

Figure 3:
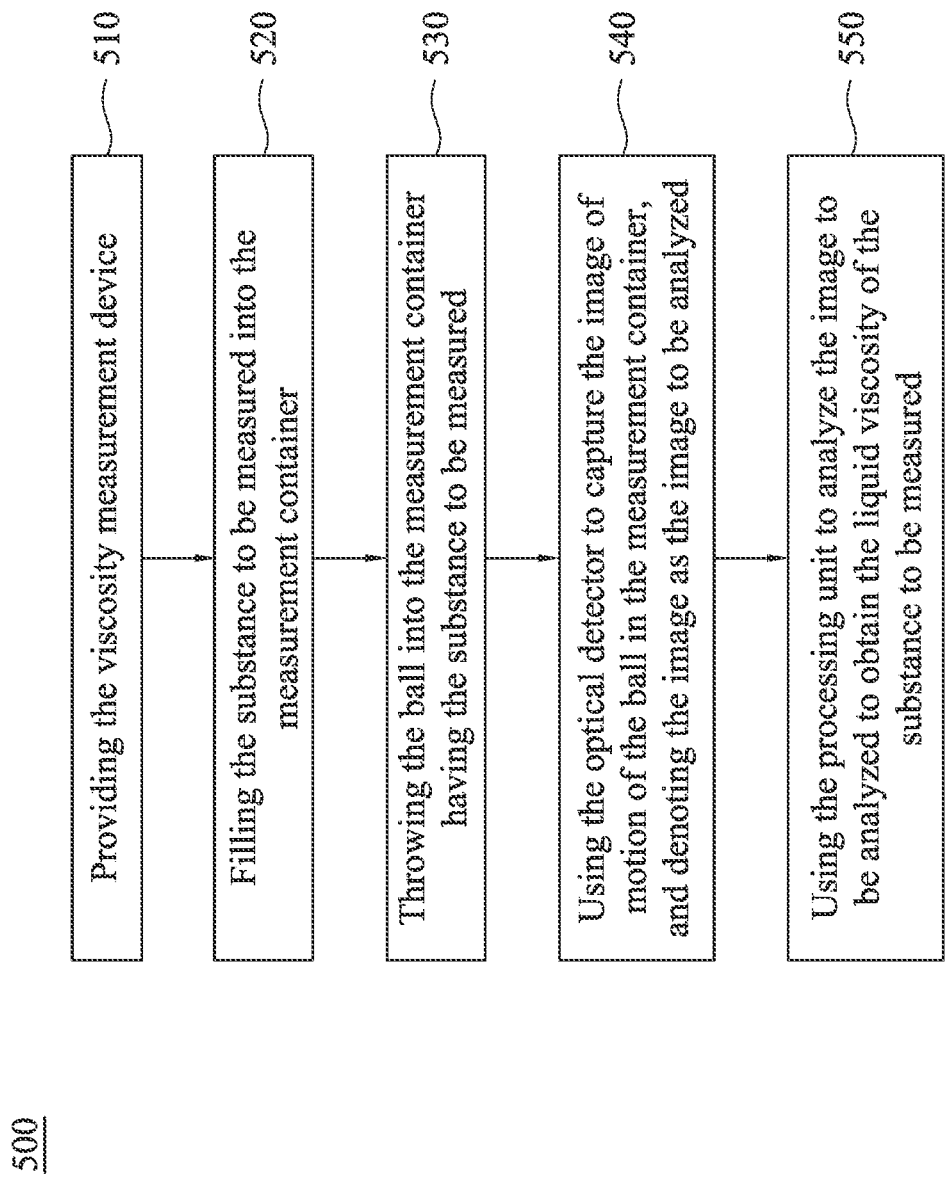
FIG. 3 shows a flow chart of a method for measuring viscosity in accordance with one embodiment of the present invention.

Refer to FIG. 1 and FIG. 3 simultaneously, in which FIG. 3 shows a flow chart of a method for measuring viscosity in accordance with one embodiment of the present invention. The present invention provides a method 500 for measuring viscosity, and the method includes following steps. First of all, a step 510 is performed to provide the viscosity measurement device 100 as shown in FIG. 1 and FIG. 2. Next, a step 520 is performed to fill the measurement container 200 with the substance S1 to be measured. Then, a step 530 is performed to put the ball A1 into the measurement container 200 containing the substance S1 to be measured. A step 540 is performed at the same time as the step 530 to use the optical detector 310 to capture the image of the ball A1 moving in the measurement container 200 and denote the image as the image to be analyzed. After obtaining the image to be analyzed, a step 550 is performed to analyze the image to be analyzed by using the processing unit 320 to obtain the liquid viscosity of the substance to be measured. Since different substances S1 to be measured have different properties and densities, after the ball A1 is put into the substances S1 to be measured, the resistance of the substances S1 to be measured on the ball A1 from the highest point to the lowest point is different, and thus the moving speeds are different as well. Therefore, after the capturing of the image by the optical detector 310 and the analyzing by the processing unit 320, the viscosity of the substance S1 to be measured can be computed accurately.

The following table 1 is used to present the comparison of measuring viscosity of substance by using the viscosity measurement device of the embodiment of the present invention or not. The embodiment represents that operators only need to put the substance to be measured into the measurement container 200 of the viscosity measurement device 100 of the present invention, and use the controlling unit 340 to open the optical detector 310 to capture the image of motion of the ball A1 in the substance S1 to be measured, the temperature and the viscosity of the substance S1 to be measured can thus be known from the display device 360; whereas the comparative example represents that the operators use eyes to observe the process of falling of the ball and use stopwatch to compute the time of falling of the ball, and further computes the viscosity of the substance to be measured.

TABLE 1

The comparison between embodiment and comparative example

|  | Item | seconds | Percentage Of Variation |  | Item | Seconds | Percentage Of Variation |
|---|---|---|---|---|---|---|---|
| Comparative example | 1 | 89.76 | 0.93% | Embodiment | 1 | 91.48 | 0.38% |
|  | 2 | 90.3 |  |  | 2 | 91.25 |  |
|  | 3 | 91.41 |  |  | 3 | 91.93 |  |

From the table 1 above, it can be known that three experiments of measuring viscosity are made by the embodiment of the present invention and the comparative example respectively, and the comparative example shows that percentage of variations obtained by using eyes to observe the falling process of the ball and using the stopwatch to record the falling time are apparently higher than those of the experiments of the embodiment, which means the viscosity measurement device and the method for measuring viscosity of the embodiment of the present invention have the higher accuracy.

From the above embodiment of the present invention, it can be seen that the viscosity measurement device of the present invention mainly uses the optical detector to detect the process of moving of the ball in the substance to be measured, and computes the viscosity of the substance to be measured through the way of image analyzing such that the entire accuracy of measuring can be improved. On the other hand, the entire structure of the present invention is simplified compared to the conventional technology, and thus it has the advantages of easy operation and low cost.

Even though the embodiments of the present invention are disclosed by the aforementioned embodiments, the aforementioned embodiments are not used for limiting the embodiments of the present invention. For any those skilled in the art, various modifications and variations may be made to the structure of the present invention without departing from the scope or spirit of the embodiments of the present invention, therefore, the protected scope of the embodiments of the present invention should be defined based on the following claims.

What is claimed is:

1. A viscosity measurement device comprising:
   a measurement container configured to accommodate a substance to be measured and a ball;
   an optical detection processing device disposed at a side of the measurement container, and configured to obtain an image to be analyzed of the measurement container and analyze the image to be analyzed, wherein the optical detection processing device comprises:
      an optical detector disposed in front of the measurement container, wherein the optical detector is configured to obtain the image to be analyzed from the measurement container;
      a processing unit signally connected to the optical detector, and the processing unit being configured to process and analyze the image to be analyzed;
      a database signally connected to the processing unit and the optical detector, wherein the database is configured to store the image to be analyzed obtained by the optical detector and the image to be analyzed from the processing unit;
      a controlling unit signally connected to the optical detector and the processing unit, the controlling unit being configured to control operations of the optical detector and the processing unit; and
      a power supplying unit electrically connected to the optical detector, the processing unit, and the controlling unit, wherein the power supplying unit is configured to provide power for the optical detector, the processing unit, and the controlling unit; and
   a light-emitting element, wherein the light-emitting element and the optical detector are located at two opposite sides of the measurement container, the light-emitting element is electrically connected to the controlling unit and the power supplying unit, and the light-emitting element is disposed behind the measurement container for lighting to overexpose a background for highlighting a contrast of the image to be analyzed which is obtained by the optical detector.

2. The viscosity measurement device of claim 1, wherein the optical detection processing device further comprises a display device signally connected to the processing unit, the controlling unit, and the power supplying unit, and wherein the display device is configured to display an analyzed result of the processing unit.

3. The viscosity measurement device of claim 1, wherein the measurement container is a light-transmissible container, and a plurality of graduations disposed on a surface of the measurement container.

4. The viscosity measurement device of claim 1, wherein the image to be analyzed is a dynamic image, the dynamic image comprises a moving image of the ball in the substance to be measured, and the processing unit is configured to compute liquid viscosity of the substance to be measured according to recording time of the dynamic image.

5. The viscosity measurement device of claim 4, wherein the optical detector comprises a motion detecting element, and the motion detecting element is configured to detect a motion of the ball.

6. The viscosity measurement device of claim 1, wherein the image to be analyzed is a static image, the static image comprises pictures of the ball in the substance to be measured, and the processing unit compares the static image with a reference image to determine whether the ball touches an inner wall of the measurement container or not.

7. A method for measuring viscosity, comprising:
providing the viscosity measurement device of claim 1;
filling the measurement container with the substance to be measured;
putting the ball into the measurement container containing the substance to be measured;
using the optical detector to capture an image of the ball moving in the measurement container as the image to be analyzed; and
using the processing unit to analyze the image to be analyzed to obtain liquid viscosity of the substance to be measured.

8. The method for measuring viscosity of claim 7, wherein the image to be analyzed is a dynamic image, the dynamic image comprises a moving image of the ball in the substance to be measured, and the processing unit is configured to compute the liquid viscosity of the substance to be measured according to recording time of the dynamic image.

9. The method for measuring viscosity of claim 7, wherein the optical detector comprises a motion detecting element, and the motion detecting element is configured to detect a motion of the ball.

10. The method for measuring viscosity of claim 7, wherein the optical detection processing device further comprises a display device signally connected to the processing unit, the controlling unit, and the power supplying unit, and wherein the display device is configured to display an analyzed result of the processing unit.

11. The method for measuring viscosity of claim 10, wherein the display device is further configured to display temperature of the substance to be measured.

12. The method for measuring viscosity of claim 7, wherein the measurement container is a light-transmissible container, and a plurality of graduations are disposed on a surface of the measurement container.

13. The method for measuring viscosity of claim 7, wherein the database further stores temperature and density of the substance to be measured.

* * * * *